United States Patent Office 3,462,459
Patented Aug. 19, 1969

3,462,459
3-ALKANOYL-7-ALKYL-5-HYDROXYCOUMARINS
Timothy Y. Jen, Havertown, Gordon A. Hughes, Haverford, and Herchel Smith, Wayne, Pa., assignors to American Home Products Corporation, New York, N.Y., a corporation of Delaware
No Drawing. Filed May 12, 1967, Ser. No. 637,896
Int. Cl. C07d 7/28
U.S. Cl. 260—343.2          2 Claims

ABSTRACT OF THE DISCLOSURE 3-alkanoyl-7-alkyl - 5 - hydroxycoumarins, alkali metal salts and esterified derivatives thereof (I) are prepared by condensing a novel 4-alkyl-2,6-dihydroxybenzaldehyde (II) with an alkyl alkanoylacetate (III) and, if required, esterifying or forming a salt with an alkali metal base. Compounds (I) are pharmacologically active, especially as central nervous system depressants.

---

This invention relates to substituted 3-acetylcoumarins. More particularly, it relates to 3-alkanoyl-7-alkyl-3-hydroxycoumarins, to salts and esters thereof and to intermediates useful to prepare them. The instant 3-acetylcoumarin compounds have depressant properties when tested under standard and accepted pharmacological procedures. They are, therefore, deemed to possess utility in experimental and comparative pharmacology.

DESCRIPTION OF THE INVENTION

The therapeutically-useful compounds contemplated by the invention are those of Formula I:

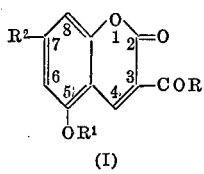

(I)

wherein:

R is alkyl of from about 1 to about 6 carbon atoms;
$R^1$ is hydrogen, alkanoyl of from about 2 to about 6 carbon atoms or alkali metal; and
$R^2$ is alkyl of from about 2 to about 12 carbon atoms.

When used herein and in the appended claims, "alkyl of from about 1 (or 2) to about 6 (or 12 as the case may be) carbon atoms" includes straight and branched chain hydrocarbon radicals illustrative members of which are: methyl, ethyl, propyl, i-propyl, n-butyl, i-butyl, t-butyl, n-pentyl, n-hexyl, 3-methylpentyl, 2-ethylbutyl, n-octyl, n-nonyl, n-decyl, n-undecyl, n-dodecyl, 2,3- dimethylheptyl, and the like. The term "alkanoyl of from about 2 to about 6 carbon atoms" includes those derived from straight or branched chain hydrocarbon carboxylic acids, and include, for example: acetyl, propionyl, t-butyroyl, n-valeroyl, n-hexanoyl, 2-ethylbutyroyl, and the like. "Alkali metal" includes lithium, sodium or potassium.

Special mention is made of a particularly valuable embodiment of this invention. This is 3-acetyl-5-hydroxy-7-n-pentylcoumarin, a compound of Formula I wherein R is methyl, $R^1$ is hydrogen and $R^2$ is n-pentyl. This compound exerts especially useful depressant activity.

The compounds of this invention can be obtained in a number of ways. One especially convenient means to obtain compounds of Formula I comprises reacting a 4-alkyl-2,6-dihydroxybenzaldehyde of Formula II

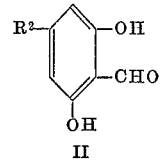

II wherein $R^2$ is as defined hereinabove, with an alkyl alkanoylacetate of Formula III

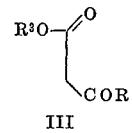

III wherein R is as defined above and $R^3$ is alkyl of from about 1 to about 6 carbon atoms, preferably ethyl, until formation of a 3-alkanoyl-7-alkyl-5-hydroxycoumarin ring is substantially complete and then, if required, esterifying the 5-hydroxy group with an alkanoylating agent such as an alkanoyl halide, an alkanoic anhydride, an ester of an alkanoic acid with a lower alkanol, or an obvious chemical equivalent thereof, or, if required, forming an alkali metal salt thereof by reaction with an alkali metal base such as a hydroxide or a carbonate or an obvious chemical equivalent thereof.

Compounds of Formula II are new and are contemplated by the instant invention, being especially valuable as intermediates in the preparation of compounds of Formula I. The aldehyde starting materials of Formula II can be easily made. For example, the especially valuable compound of Formula II wherein $R^2$ is n-pentyl is prepared by reacting 5-n-pentylresorcinol with zinc cyanide in the presence of hydrogen chloride, and hydrolyzing the resulting complex with water, as will be exemplified in detail hereinafter. Other aldehydes of Formula II are obtained by entirely analogous procedures.

The alkyl alkanoylacetates of Formula III are readily available or can be easily prepared. For example, ethyl acetoacetate is prepared according to procedures described in Organic Syntheses, Col. vol. 2, 2nd, Edition (1941), p. 235.

The formation of the 3-acetyl-7-alkyl-5-hydroxycoumarin is accomplished by bringing the reactants together (the lower molecular weight reactants do not require a solvent, the higher molecular reactants condense more readily if an inert diluent, such as benzene, ether, or the like is used) preferably in the presence of a small amount of a basic condensing catalyst, such as piperidine or the like. The reaction conditions are not particularly critical; the condensation occurs smoothly at temperatures of from about 10° C. to about 100° C., and it is especially convenient to use about 25° C. The reaction time depends on the temperature of the medium and the nature of the reactants. Generally, from about 1 to about 24 hours is sufficient; if room temperature, i.e., about 25° C., is used, the condensation is substantially complete in about 12 hours. The product can be recovered by entirely conventional techniques. One especially useful means is to pour the reaction mixture into a mixture of ether and 10% hydrochloric acid. The mixture is washed until neutral with brine and the organic layer is separated and evaporated to dryness, leaving the product as a residue. If desired, it can be purified by recrystallization from a lower alkanol, such as methanol.

The esterified derivatives included within the scope of Formula I are prepared, for example, by suspending the 5-hydroxy compound in ether and treating it with an alkanoylating agent, such as acetic anhydride, preferably in the presence of a basic acid acceptor, such as potassium carbonate. Reaction occurs readily at temperatures of about 25° C., and after completion of the reaction, about 3 hours is sufficient, the product can be recovered by filtration. If desired, recrystallization from a lower alkanol, such as methanol, affords an increase in purity.

The alkali metal derivatives of Formula I are prepared by conventional techniques. One useful means is to treat the 5-hydroxy compounds with a stoichiometrically equivalent amount of an aqueous solution of the appropriate alkali metal hydroxide or carbonate, then to freeze-dry the mixture leaving the desired derivative as a residue.

Compounds of Formula I possess valuable pharmacological activity. In particular these new compounds in standard pharmacological procedures demonstrate nervous system activity and are useful as depressants. Because of this property they are of importance in experimental and comparative pharmacology.

In the pharmacological evaluation of the central nervous system depressant compounds of this invention the in vivo effects of the instant compounds were tested as follows:

The compound is administered intraperitoneally to three mice (14 to 24 grams) at each of the following doses: 400, 127, 40 and 12.7 mg./kg.

The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate method" [Nathan B. Eddy and Dorothy Leimbach, J. Pharmacol. Exper. Therap., 107, 385 (1953)] is used to test for analgesia. The experiment is terminated by subjecting each animal to a maximal electroshock to test for anti-convulsant activity.

The compound of this invention which is 3-acetyl-5-hydroxy-7-n-pentylcoumarin in the above test procedure induced decreased motor activity at 40 mg./kg.; sedative-ataxic effects at 127 mg./kg.; catalepsy at 127 mg./kg.; decreased respiration at 40 mg./kg.; ptosis at 127 mg./kg. and hyperemia at 127 mg./kg. There were no deaths in the test animals at the highest dose used, 400 mg./kg., intraperitoneally.

DESCRIPTION OF THE PREFERRED EMBODIMENTS

The following examples show representative products of this invention. They are merely illustrative and are not to be construed to limit the scope of the claims in any manner whatsoever.

EXAMPLE 1

3-acetyl-5-hydroxy-7-n-pentylcoumarin (a) 2,6 - dihydroxy - 4 - n - pentylbenzaldehyde.— Hydrogen chloride is passed through a mixture of 5-n-pentyl-1,3-dihydroxybenzene (48 g.) and zinc cyanide (32.6 g.) in ether (500 ml.) at 0° for 5 hours. The ether is removed and the residue heated with water (1.5 l.) on a steam bath for 70 min. The cooled mixture is extracted with chloroform and the organic solution washed dried and evaporated. The residue is recrystallized from a mixture of benzene and hexane to give 4-n-pentyl-2,6-dihydroxybenzaldehyde (32 g.), M.P. 53–56°.

(b) 3 - acetyl - 5 - hydroxy - 7 - n - pentylcoumarin.— A mixture of 1.0 g. of 2,6-dihydroxy-4-n-pentylbenzaldehyde, 0.65 g. of ethyl acetoacetate and 5 drops of piperidine is kept at 25° C. for 12 hours, then is poured into ether-10% HCl. After washing with brine until neutral, the organic layer is dried and evaporated to a gum which crystallizes on scratching with cold methanol to give 450 mg. of product, M.P., 171–175° C. (with decomposition). Recrystallization from ethanol affords 370 mg., M.P., 176–178° C.;

$\lambda^{KBr}_{max.}$ 3.25, 5.92 mμ;

$\lambda^{EtOH}_{max.}$ 376 mμ (ε18,600), 436 mμ (ε13,000).

EXAMPLE 2

5-acetoxy-3-acetyl-7-n-pentylcoumarin

A suspension of 600 mg. of 3-acetyl-5-hydroxy-7-n-pentylcoumarin, 600 mg. of potassium carbonate and 0.2 ml. of acetic anhydride in 10 ml. of anhydrous ether is stirred at 25° C. for 3 hours. The reaction mixture is filtered and the precipitate is washed with ether. The filtrate is evaporated and water is added to the residue. The solid material thus obtained is recrystallized from methanol to afford 620 mg. of product, M.P., 71–75° C.; λmax 5.65, 5.76, 5.92 m.

Analysis.—Calc. for $C_{18}H_{20}O_5$: C, 68.34; H, 6.37. Found: C, 68.12; H, 6.24.

EXAMPLE 3

3-acetyl-5-hydroxy-7-n-pentylcoumarin, sodium salt

A suspension of 500 mg. of 3-acetyl-5-hydroxy-7-n-pentylcoumarin in 5 ml. of water is treated with one stoichiometric equivalent of sodium carbonate as a 10% by weight aqueous solution. The reaction mixture is freeze-dried, leaving the desired product as a residue.

EXAMPLE 4

(a) The procedure of Example 1, step (a) is repeated with appropriately-substituted 5-alkyl-1,3-dihydroxybenzenes and the following 4-alkyl-2,6-dihydroxybenzaldehydes are obtained:

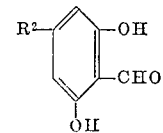

$R^2$
$CH_2CH_3$
$CH_2(CH_2)_{10}CH_3$
$CH(CH_3)CH(CH_3)(CH_2)_4CH_3$ (b) The procedures of Examples 1–3 are repeated substituting stoichiometrically equivalent amounts of appropriately - substituted 4 - alkyl-2,6-dihydroxybenzaldehydes, alkyl alkanoylacetates, alkanoyl anhydrides or chlorides, and alkali metal carbonates or hydroxides for the reagents used therein. The following 3-alkanoyl-7-alkyl-5-hydroxycoumarins and derivatives are obtained:

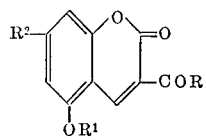

| R | R₁ | R₂ |
|---|---|---|
| $CH_2CH_3$ | H | $CH_2CH_3$ |
| $CH_2(CH_2)_5CH_3$ | H | $CH_2(CH_2)_{10}CH_3$ |
| $CH_2CH(CH_2CH_3)CH_2CH_3$ | H | $CH(CH_3)CH(CH_3)-(CH_2)_4CH_3$ |
| $CH_3$ | $CO(CH_2)_4CH_3$ | $CH_2(CH_2)_4CH_3$ |
| $CH_3$ | $CO\ CH(CH_3)_2$ | $CH_2(CH_2)_4CH_3$ |
| $CH_3$ | K | $CH_2(CH_2)_4CH_3$ |
| $CH_3$ | Li | $CH_2(CH_2)_4CH_3$ |

We claim:
1. A compound of the formula
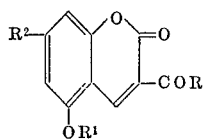
wherein:
R is alkyl of from 1 to 6 carbon atoms;
R¹ is hydrogen, alkanoyl of from 2 to 6 carbon atoms or alkali metal; and
R² is alkyl of from 2 to 12 carbon atoms.
2. 3-acetyl-5-hydroxy-7-n-pentylcoumarin.
References Cited
Weiss et al., Chemical Abstracts, vol. 23 (1929), p. 3219.
JAMES A. PATTEN, Primary Examiner
U.S. Cl. X.R.
260—600; 424—281